United States Patent [19]

Wilkinson

[11] Patent Number: 5,230,076

[45] Date of Patent: Jul. 20, 1993

[54] IONOSPHERIC SOUNDING

[75] Inventor: Robert G. Wilkinson, Portsmouth, England

[73] Assignee: The Secretary of State for Defence in Her Britannic Majesty's Government of the United Kingdom of Great Britain and Northern Ireland, London, England

[21] Appl. No.: 807,972

[22] Filed: Oct. 29, 1985

[30] Foreign Application Priority Data

Oct. 30, 1984 [GB] United Kingdom ............... 8427440

[51] Int. Cl.$^5$ .......................................... H04B 17/00
[52] U.S. Cl. ........................................ 455/62; 455/63; 455/67.1; 455/226.1; 455/226.2; 455/226.3; 375/1
[58] Field of Search ................ 455/63, 65, 69, 160.1, 455/161.1–161.3, 67.1, 226.1–226.3; 375/110

[56] References Cited

U.S. PATENT DOCUMENTS

| | | | |
|---|---|---|---|
| 1,761,118 | 6/1930 | Goldsmith | 375/1 |
| 2,191,277 | 2/1940 | George | 455/62 X |
| 3,020,399 | 2/1962 | Hollis | 375/1 |
| 3,160,813 | 12/1964 | Biggi et al. | 455/62 |
| 3,351,859 | 11/1967 | Groth, Jr. et al. | 375/1 |
| 3,443,228 | 5/1969 | Brenner et al. | 455/62 |
| 3,475,684 | 10/1969 | Covill | 455/62 X |
| 3,475,685 | 10/1969 | Covill | 455/62 X |
| 3,495,176 | 2/1970 | Egan | 455/62 X |
| 3,532,988 | 10/1970 | Magnuski | 455/62 |
| 3,617,891 | 11/1971 | Covill | 455/62 |
| 3,961,172 | 6/1976 | Hutcheon | 364/574 |
| 4,140,973 | 2/1979 | Stevens | 455/62 |
| 4,155,040 | 5/1979 | Harmon et al. | 455/62 X |
| 4,197,500 | 4/1980 | Klein et al. | 455/62 |
| 4,280,128 | 7/1981 | Masak | 342/380 |
| 4,308,617 | 12/1981 | German, Jr. | 380/34 |
| 4,309,773 | 1/1982 | Johnson et al. | 455/62 |
| 4,328,581 | 5/1982 | Harmon et al. | 455/62 X |
| 4,334,322 | 6/1982 | Clark, III | 455/62 |
| 4,346,475 | 8/1982 | Alexis | 375/1 |
| 4,365,347 | 12/1982 | Otsuka et al. | 455/62 X |
| 4,475,215 | 10/1984 | Gutleber | 375/1 |
| 4,485,477 | 11/1984 | Nossen | 375/1 |
| 4,538,280 | 8/1985 | Mosley, Jr. et al. | 375/1 |
| 4,555,806 | 11/1985 | Lange et al. | 455/62 |
| 4,599,733 | 7/1986 | Gutleber | 380/8 |
| 4,607,375 | 8/1986 | Lee | 375/1 |

FOREIGN PATENT DOCUMENTS 1087870 10/1967 United Kingdom .

OTHER PUBLICATIONS

Stremler, *Intro. to Communications Systems*, pp. 590–596; (Addison-Wesley, 1982).

"Spread Spectrum Systems" by Robert C. Dixon 2nd Edition 1984.

*Primary Examiner*—Bernarr E. Gregory
*Attorney, Agent, or Firm*—Nixon & Vanderhye

[57] ABSTRACT

An ionospheric sounding system for frequency management of a HF communications system operates between a transmitter and a remote receiver and makes use of code-modulated narrow band sounding pulses transmitted at frequencies throughout the HF band. The code has an impulsive auto-correlation function and the frequency selection is pseudo-random. The code may be a two-part complementary code. Alternatively the code may be a selected one of a family of codes possessing high auto-correlation and low cross-correlation properties, thereby enabling communications management information to be conveyed by the choice of code. Measurements of signal and noise are made at the receiver for each transmitted frequency to assist establishing a HF communications link. Synchronous detection of the received signal is used, employing correlators (103, 104) in phase quadrature.

35 Claims, 10 Drawing Sheets

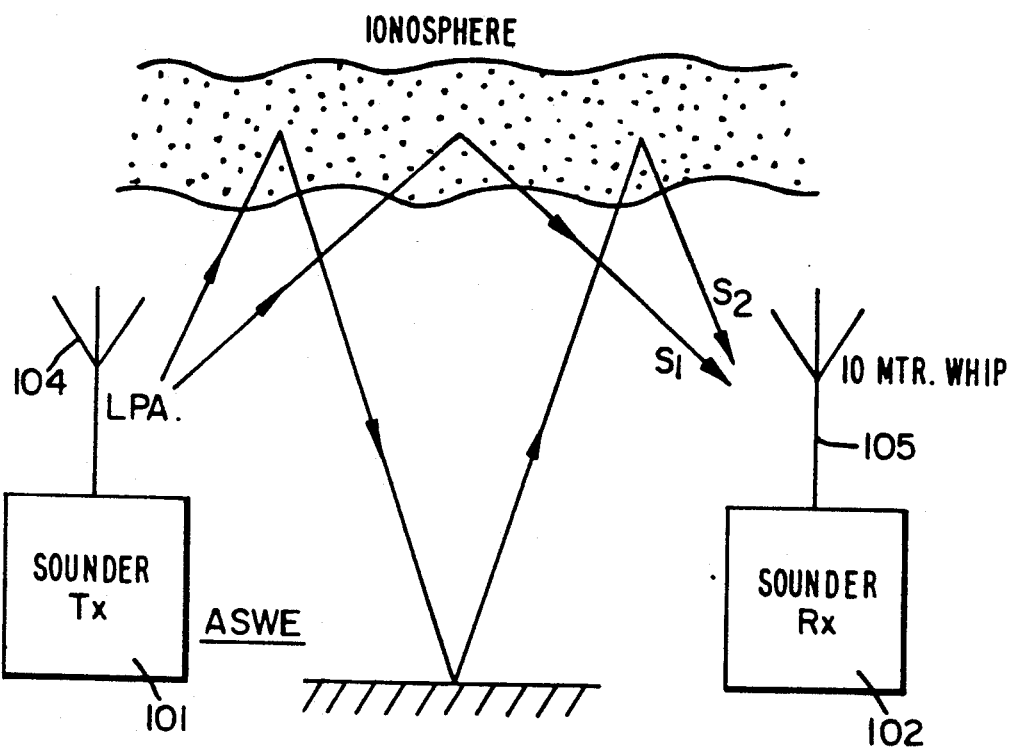
Fig.1.
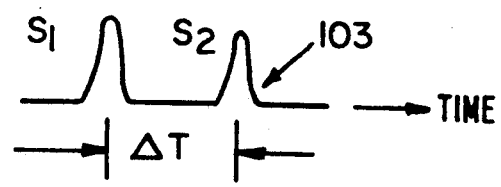

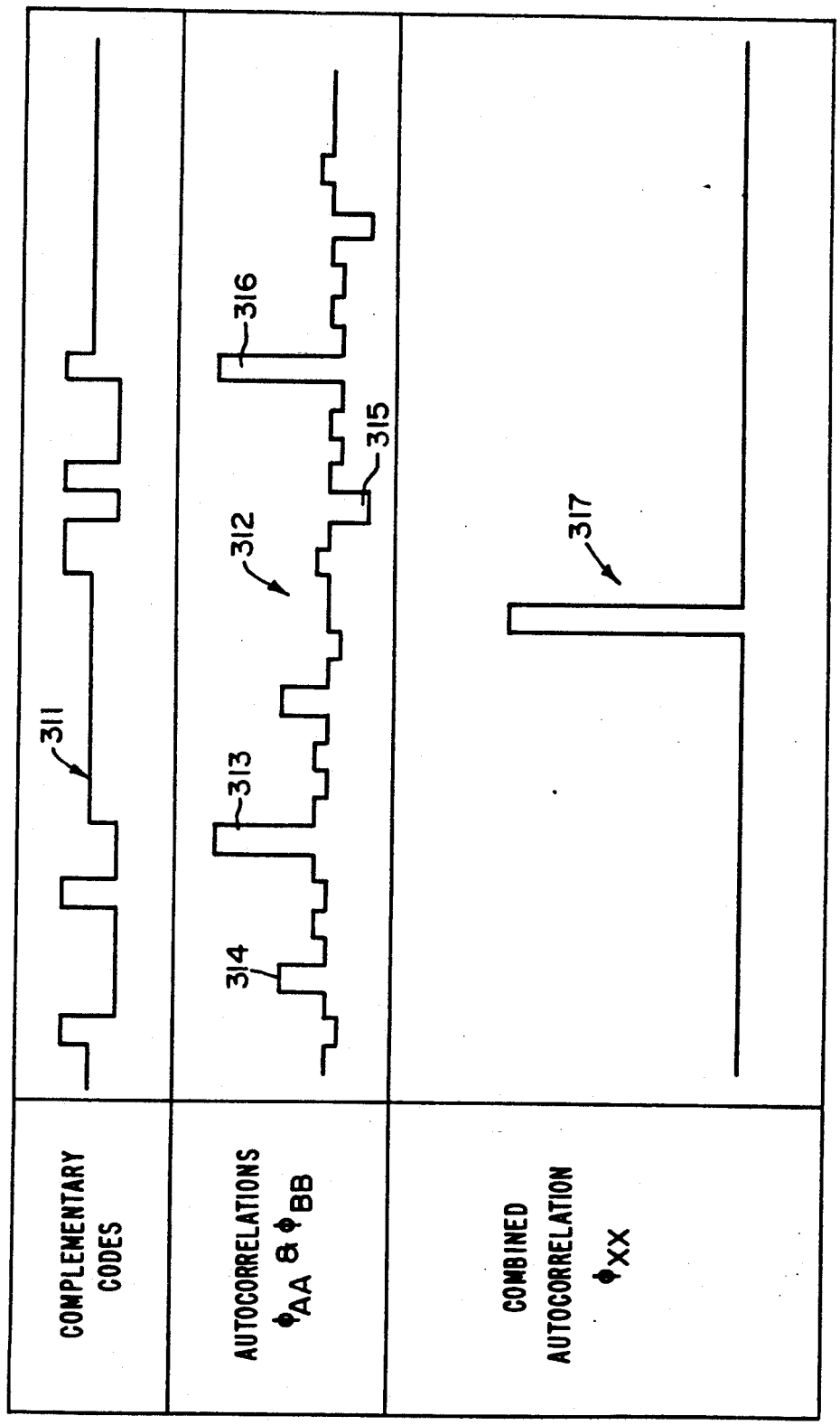

IONOSPHERIC SOUNDING

The invention relates to an ionospheric sounding unit for providing information to improve HF communications utilising long range sky-wave paths.

Communicating over HF radio circuits particularly long range sky-wave paths has always been recognized as a sporadic and a generally unreliable method for sending messages.

This is due, to a large extent, to the naturally sporadic and transitory nature of the propagating medium being used which is in the main caused by the variability in the free electron density of the ionosphere. Also to be considered is the intensity and density of interference from other HF band users.

These factors have alone given rise to a situation where on-demand communications cannot normally be expected even for relatively short-haul circuits. Neither can high quality, low error rate circuits be acquired or maintained without regular changes in operating frequency and/or without using very high power radio transmitters in conjunction with high gain directional antennas.

For the Royal Naval warship this situation is even worse. Here, because of the limited size of the platform, high transmitter powers are impracticable and large HF directional antenna arrays are impossible. Coupled with this are the intractable problems of working in a hostile environment where it is normally operationally necessary to simultaneously transmit and/or receive over a very broad spectrum of frequencies. These may include ELF, VLF, LF, MF, HF, V/UHF and also much higher X band radar frequencies.

It is therefore very easy to appreciate why it is that HF communications have been historically losing popularity to the more reliable and robust satellite communications networks for long distance circuits.

Nevertheless from the military point of view the vulnerability of these satellite systems, including physical attack, will always dictate the necessity for having an operational requirement for HF.

An efficient and effective high quality HF back-up system is therefore an important capability for the RN during any hostilities and it has the added advantage that it can always be entirely under our national control. This is currently not the case for satellite systems.

It is unfortunate that although major advances have recently been made towards increasing the sophistication, complexity and reliability of most HF communication systems and equipments (principally through the exploitation of large scale electronic circuits and in particular microprocessors) little has been done to overcome or reduce the three principal HF propagation characteristics which are responsible for the degradation of transmitted signals.

These are multipath or dispersion, interference and fading.

For a mobile platform on the land, sea or in the air, the situation is complicated by the constraints imposed in fitting HF systems within the restricted space available, particularly with regard to antennas. Transmitter powers for these mobile systems will also be constrained because of the limited space available and the inordinate cost and technical complexity of fitting radio transmitters with rf powers much higher than a few kilowatts. The typical power for an HF circuit on an RN warship is usually limited to 1 kW peak and mean per radio circuit. The problems that arise when trying to simultaneously provide up to ten or perhaps more transmitting and receiving channels would be insurmountable if greater transmitter powers were to be used. Common Antenna Working (CAW), intermodulation products, reciprocal mixing (in the receivers) and wide-band transmitter noise floors would all seriously degrade the operational performance of HF radio circuits, particularly at the lower received signal levels which are necessary for long range circuits.

Intermodulation frequency products caused by the non-linearities in the transmitters and by the ships superstructure (rusty bolt effect) can however be avoided by judicious frequency planning although this will inevitably reduce the available spectrum that can be used. Moreover this can only be accomplished if narrow-band systems are used and provided the higher order products can be ignored. If transmitter powers were to be increased these higher order products will become progressively more significant and will have to be considered in any subsequent frequency planning arrangements.

When wide-band systems are to be used the constraints that have to be placed on the frequencies for transmission and reception will become even more restrictive. This factor alone will seriously curtail any future policies for implementing frequency agile or frequency hopping and wide-band transmission systems. Furthermore, antennas used for reception will unavoidably have to be placed in close proximity to transmitting antennas and the ships superstructure. Variations in the radiation pattern in the azimuthal and elevation planes will be found as a direct result of this, producing nulls of up to 30 dB or more in any of these antennas. These radiation distortions will alter with changes in frequency and with the attitude of the ship, i.e. pitch, roll and yaw.

All these factors, as well as the general unpredictability of HF sky-wave propagation, pose a problem of numerous variables having a multiplicity of possible permutations.

Significant improvements in the realistic use of sky-wave propagation in a HF communications system can only be achieved if the user is given Real-Time data regarding all the relevant path characteristics.

The alternative to this is to rely upon long term predictions based on computer programmed models, Bluedeck etc, which can at any instant be grossly in error particularly for circuits operating into or through the higher latitudes.

Over the last decade or so many attempts have been made to use the HF band in a more systematic manner by employing various back-scatter and oblique incidence ionospheric sounding techniques. Unfortunately these systems invariably used transmitters having output powers of 30 or 100 kW and sometimes even more. Furthermore these transmitters were nearly always connected to antennas having broad-band but more importantly directional gain properties. With antenna gains of between 10 and 15 dBs the radiated powers (ERP) of these early sounders was often 1 MW or more. Using this amount of pulsed rf power inevitably caused considerable interference to other HF band users so to avoid jamming a major part of the spectrum these sounders were necessarily restricted in the number of frequencies which could be used at any one time and also in the period for which they could actually be turned on. The pulsed signals were received by a time synchronised receiver and an ionogram plot was produced for each frequency scan. Because the pulse widths of these signals were perhaps a millisecond or so wide the resolution obtained was unavoidably small but later Barker sequence coding was used to improve this to 100 μs without any loss in sensitivity. Code lengths of 11 bits or sometimes more were used to phase modulate the transmitter carrier signal at 10 kb/s. This produced a signal processing gain, on reception, of about 12 dB or more but because of certain implementation losses this was often reduced in practice to perhaps 6 dB or so.

The object of the present invention is to improve the performance of HF communications by means of judicious exploitation of the HF spectrum by real-time channel sounding. Thus the object is to provide a low power ionospheric sounder which will permit a real-time assessment of the quality of different frequency bands in the HF spectrum thereby enabling improved communications links to be established using an optomised choise of frequencies.

The invention consists of an ionospheric sounding system for providing frequency management information for high frequency (HF) communications comprising:

a. a HF radio transmitter having:
(i) frequency selection means operating such that pulses of energy can be transmitted at respective frequencies pseudo-randomly selected from the HF range of radio frequencies; and
(ii) modulation means to modulate each transmitted pulse with a code having an impulsive autocorrelation function; and b. a remote HF radio receiver having:
(i) frequency selection means capable of being programmed to sensitise the receiver to the transmitted sequence of pseudo-random frequencies; and
(ii) correlation means for correlating the received signal during each pulse interval with a replica of the transmitted code and producing an output signal indicating detection of a transmitted signal.

The term "impulsive autocorrelation function" applied herein to the code modulating the transmitted signal is a noise-like function with no recognizable pattern. When a signal, modulated by such a code, is correlated against itself, the correlation function is zero or near zero everywhere except when the modulated signal is in exact register with its replica at which time the correlation is high. Preferably the code is a complementary code having two parts whose separate autocorrelation functions add to produce an impulsive function. Preferably also double side band amplitude modulation (dsb AM) is used. Advantageously the transmitter is provided with a time code modem and a modulation control, the modulation control selectively connecting the sounding code or the time code to the modulation means. The receiver is provided with a similar time code modem to provide time of day information and facilitate synchronising of the receiver with the received signal. In an advantageous arrangement the two parts of the complementary code are separated by greater than about 10 ms to prevent corruption of the second received part by echo signals of the first received part.

As an alternative to using a single sounding code the code may be a selected one of a pleurality of codes with the receiver being provided with a means to receive and distinguish each code thereby enabling information to be transmitted.

Advantageously synchronous signal detection is employed including means to compensate for frequency and phase variations in the received carrier frequency. This is achieved by connecting the received signal to sin and cos product detectors, and also connecting a local frequency signal to the product detectors, the local frequency being derived from the transmitted carrier signal by filtering out the dsb modulation from the received signal. The outputs from the product detectors are connected to respective real and imaginary cross-correlators and the outputs from the cross-correlators are then combined to produce the phase-insensitive modulus impulse response.

Preferably the receiver has an automatic gain control (AGC) and there is provided means to measure the AGC level during each received pulse. Advantageously there may be provided means to modify the measured receiver AGC level such that the measured peak impulse response level can be calibrated. Also it is advantageous to include means to measure the mean noise level in the receiver prior to a measurement interval or window when the peak impulse response is measured. A comparator may be included such that an output signal is generated whenever the measured peak exceeds the mean noise level by a predetermined amount. The receiver may be provided with means to record the received signal strength measured in dB, the measured noise level and the mode structure (impulse response) for each transmitted frequency.

The invention will now be described by way of example only with reference to the accompanying Drawings of which:

FIG. 1 is a schematic representation of the invention showing two skywaves;

FIG. 3C illustrates a complementary sounding code;

Figure 2:
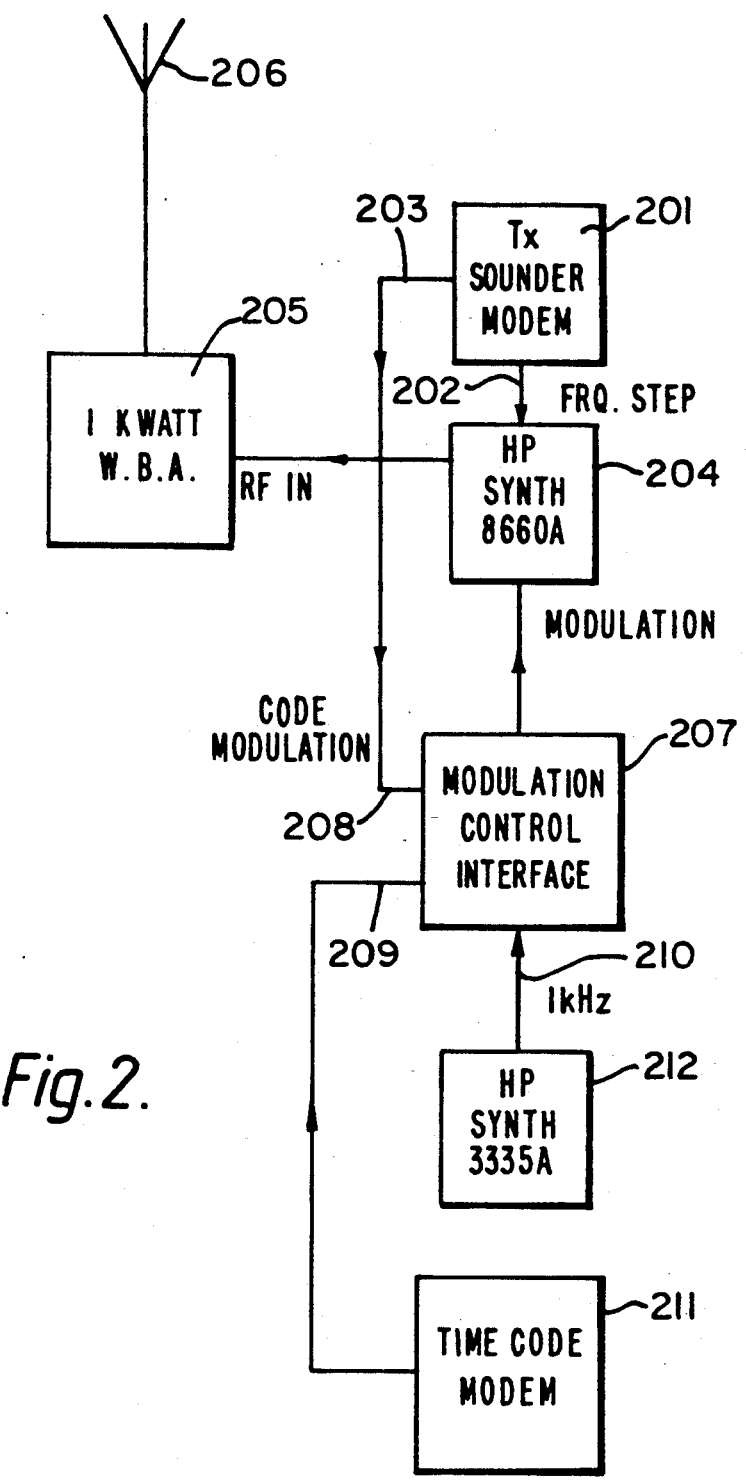
FIG. 2 is a block diagram of a sounder transmitter.

Choosing the best frequency for transmission is important for two well known basic reasons:

The first would be that a frequency chosen more or less at random will not necessarily be able to propagate via the ionosphere to a distant receiver and certainly not for 100 percent of the frequencies tried. Frequency predictions and planned optimum working frequencies used in conjunction with short-term predictions derived from limited ionospheric soundings do help but the variability of the ionosphere is generally so great and so rapid that this method of frequency selection can still only be used as a guide. Real-Time channel sounding on the other hand should provide a relevant solution to this particular problem.

The second reason for wanting to operate on an optimal working frequency is that even if a randomly chosen frequency can propagate through the ionosphere it will more than likely be totally corrupted by radio interference from other HF users when it arrives at the remote receiver. Choosing the best or optimal working frequency therefore means finding a frequency or frequencies that will not only propagate over long-distant sky-wave paths but will also have relatively low levels of in-band interference at the remote radio receiver.

The basic model of a HF sounding system is shown in FIG. 1. This shows two sky-waves $S_1$ and $S_2$ propagating between a sounder transmitter 101 and a remote sounder receiver 102. Sky-wave $S_1$ reaches the receiver after one reflection in the ionosphere while the multipath sky-wave $S_2$ is reflected twice in the ionosphere and once at the ground. The actual number and type of signals received will depend primarily upon:

a. the height and density of the reflecting ionospheric layers;
b. the frequency of the transmitted signal; and
c. the distance between the transmitter and the receiver.

In practice the difference in propagation times $\Delta T$ for these two sky-waves will be shorter than the duration of the two signals $S_1$ and $S_2$ so that there will be substantial overlap, and not as shown in the illustrative receiver response 103.

In order that the sounder may be operated alongside other equipment the transmitter sounder 101 has a low power amplifier output connected to a transmitter aerial 104. The transmitted signals are received by a 10 m whip aerial 105 connected to the remote sounder receiver 102.

Figure 3A:
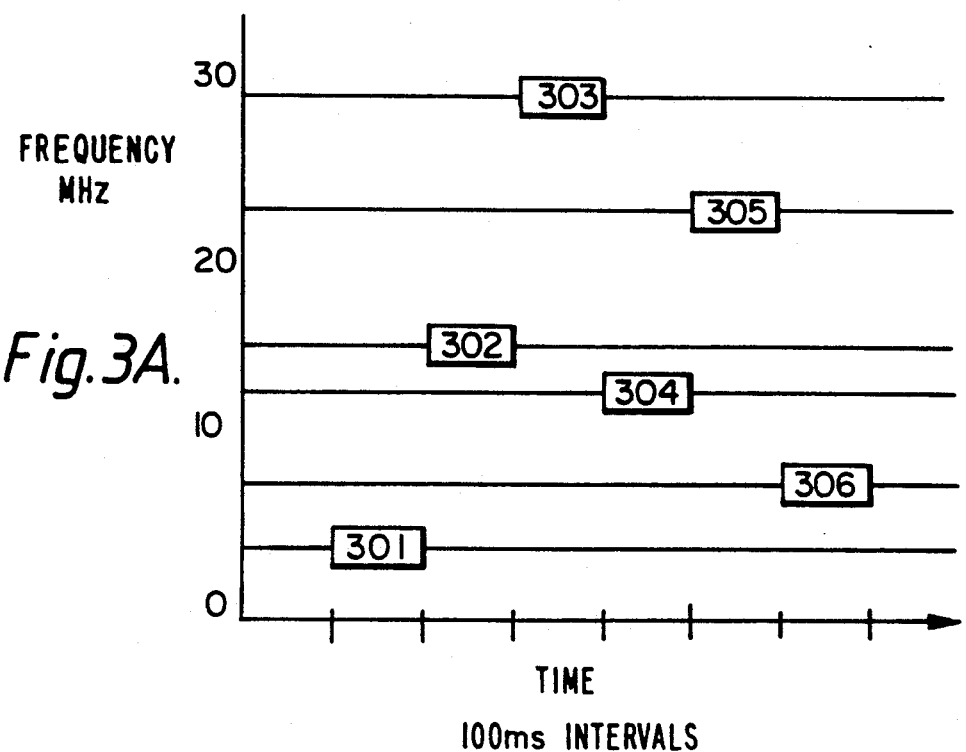
FIGS. 3A and 3B illustrate the signal format of the sounder transmitter.
Figure 3B:
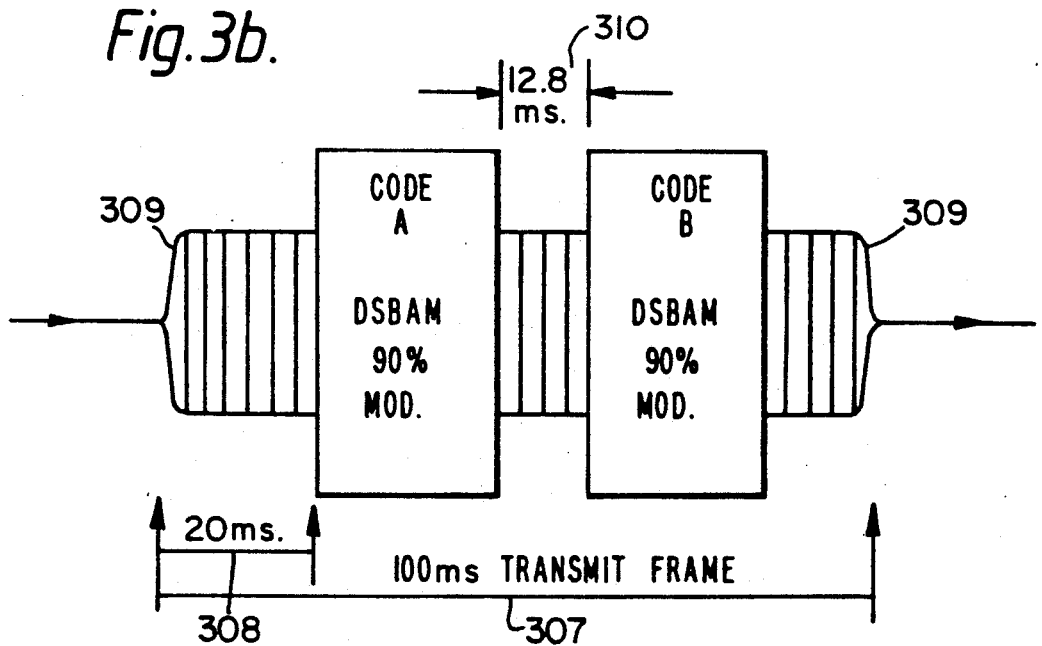

FIG. 2 is a block diagram of the sounder transmitter. A transmit sounder modem 201 produces random frequency and code modulation drives 202 and 203 respectively for a RF synthesiser 204. After power amplification in a 1 kW(peak) broad-band amplifier 205 the synthesiser signal is fed to a log-periodic directional antenna 206. The transmit frequencies are selected randomly by the modem 201 from the whole HF band from 3 to 30 MHz. Code modulation of each transmitted frequency is then used such that high receiver processing gain can be achieved to enable signals to be received without need for high transmitted power. The modulation of the output of the synthesiser 204 is controlled by a modulation control interface 207. Connected to respective inputs 208-210 of the modulation control interface 207 is the code modulation drive 203, a time code modem 211 and a framing 1 kHz tone generator 212. The modulation control interface 207 selectably connects the sounder, the time signal or the framing 1 kHz tone to the synthesiser 204 where the frequency hopping output is 90% double side band amplitude modulated (dsb AM). As can be seen from FIGS. 3A and 3B the sounder transmitter signal hops between pseudo-random frequencies, 301-306 chosen from 550 discrete frequencies distributed between 3.8 MHz and 30 MHz at ten frequency hops per second. At any one selected frequency when transmitting the sounder code the 100 ms transit frame 307 includes a first settling interval 308 of 20 ms to allow sufficient time after frequency changing for the synthesisers at both ends of the sounder link to stabilise and also to allow the receiver automatic gain control (AGC) to settle. To avoid spectral splatter the synthesiser output signal is attenuated using raised cosine shaping 309 just prior to and also after changing frequency. The modulating code consists of two parts, Code A and Code B, separated by a 12.8 ms interval 310 and transmitted at 10 kb/s. The two halves of the modulating code form a special complementary coded sequence 512 bits long (256+256 bits).

Coded sounding pulses are pulse compression signals formed from a unique sequence of binary data. The binary sequence is designed to have an impulsive auto-correlation function. Barker codes are one particular type of digital sequence but these can only be produced for relatively short sequences. An example of a complementary code sequence is shown by the signal 311 in FIG. 3C, the first half of the signal being code A and the second half being code B. The trace 312 shows the auto-correlation functions of code A ($\phi$AA) together with code B ($\phi$BB). This demonstrated that the auto-correlations $\phi$AA and $\phi$BB produce a poor peak (313) to side-lobe (314) ratio, however the side lobes e.g. 314 and 315 produced by these two codes are the exact inverse or complement of each other. The peaks 313 and 316 are of the same amplitude and polarity. Thus when these two code auto-correlation functions are added together the side lobes will cancel but the peaks will add. The resulting function $\phi$XX (317) for the complete sequence will have an infinite peak to side lobe ratio. It can be shown that the impulse response of a system under test(the mode structure of the radio path between the transmitter and the receiver) can be completely determined using a pseudo-random digital code sequence providing the auto-correlation function of the sequence is impulsive and its spectral response is greater than the bandwidth of the system under test. For a complementary code digital signal the bit rate must be made high enough to produce a frequency response which is reasonably flat over the bandwidth concerned. The length of the code is particularly important because a long sequence will produce a greater processing gain on reception. This improves the detectability of the signal in poor signal to noise conditions and also the selectivity in rejecting any other input signals. Further information on complementary codes is published in "Complementary Series" by M J E Golay, in IRE Transactions on Information Theory, Vol 17-7 pp 82-87, April 1961.

A 512 bit complementary code was adopted giving a processing gain of 27 dB. This gives a maximum resolution of about 100 $\mu$s at a detection bandwidth of 10 KHz or less.

Referring again to FIG. 2, the time clock modem 211 is described in UK patent application No 8127713. It is controlled by a 1 MHz reference timing clock and produces a pseudo-random binary coded sequence which uniquely encodes the time of day for transmission and enables a similar modem in the remote receiver to achieve timing synchronism within a very small timing error. Accurate timing and stability is essential to achieve and then maintain Synchronism between transmitter and receiver.

Although it is desirable to know the time of day to within ±5 ms or better, in order to guarantee instant synchronism, a significantly larger timing error could be easily accommodated because the receiver timing could be manually advanced or retarded to obtain perfect synchronism after starting up. Initial timing errors of up to plus or minus one or two seconds could in practice be coped with without too much difficulty provided there were a reasonable number of propagating frequencies. When however the number of operational frequencies becomes too small, through poor propagation and interference, this method of achieving synchronisation becomes progressively more difficult and time consuming to reasonably undertake.

Figure 4:
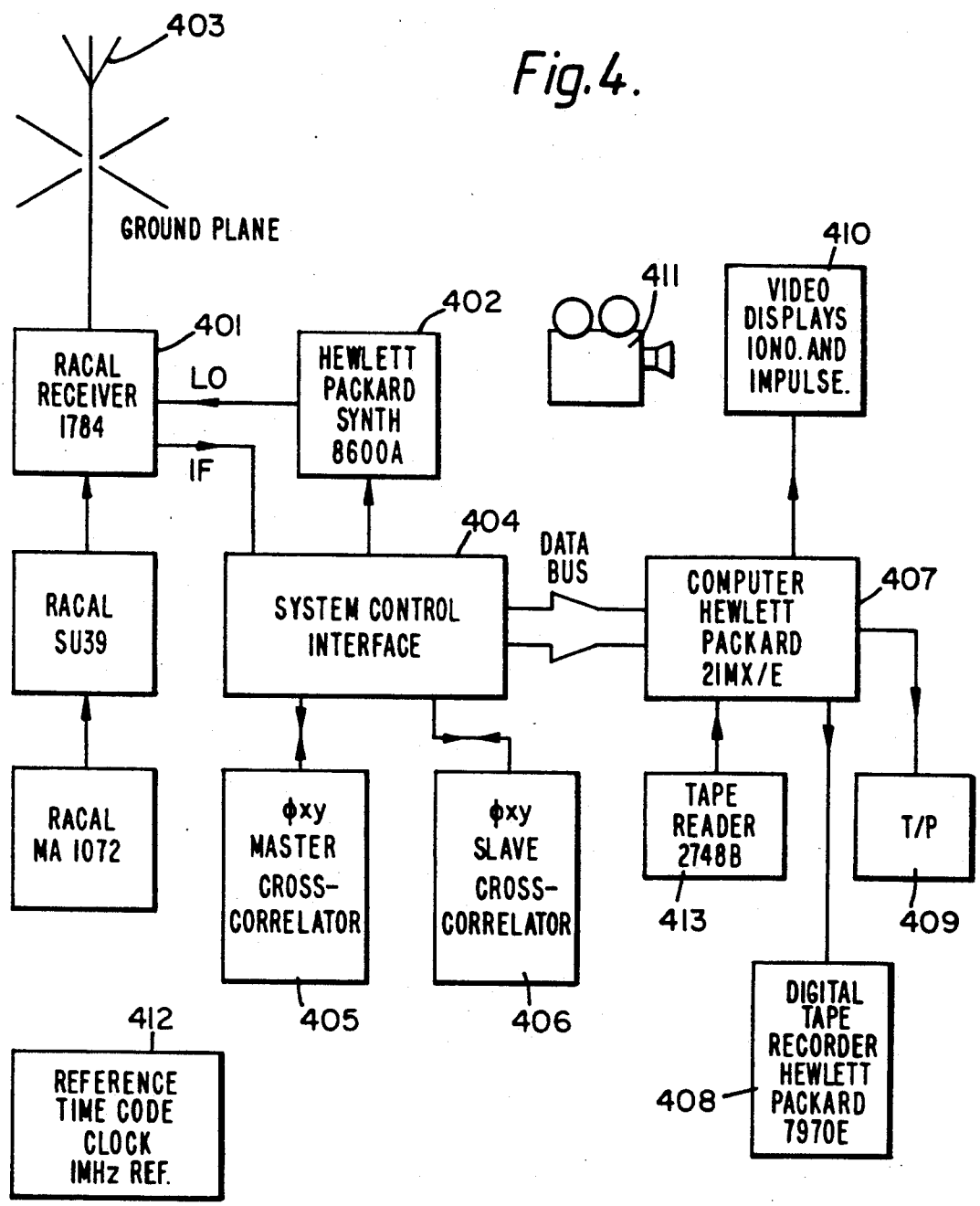
FIG. 4 illustrates a sounding signal receiver installation.

As shown in FIG. 4 a standard radio receiver 401 operates with an external local oscillator drive from a synthesiser unit 402. A 10 m whip antenna 403 connects the signal to the receiver 401. The output from the receiver 401 carries a 100 KHz intermediate frequency signal to a system control interface unit 404 where pseudo-synchronous complex amplitude demodulation occurs. This produces the appropriate in-phase (real) and quadrature phase (imaginary) detection components for the two cross-correlation units 405, 406. The circuit producing the separate detection components is described later with reference to FIG. 5. The digitised modulus (see FIG. 6) of the outputs from the cross-correlators 405 and 406 is fed to a central analysis and recording computer 407. After some preliminary analysis this data along with time and frequency markers are recorded by a digital tape recorder 408. The data can be simultaneously displayed on a printer 407 and can provide output signals for a video display 410 of ionograms and impulse responses for recording by a 16 mm camera 411. The receiver includes a time clock modem 412 operated by a 1 MHz reference source to achieve synchronism with the transmitter and for accurate time control by the system control interface 404 of the synthesisor 402 and the cross-correlators 405 and 406. A tape reader 413 is provided for program control of the computer 407.

Figure 5:
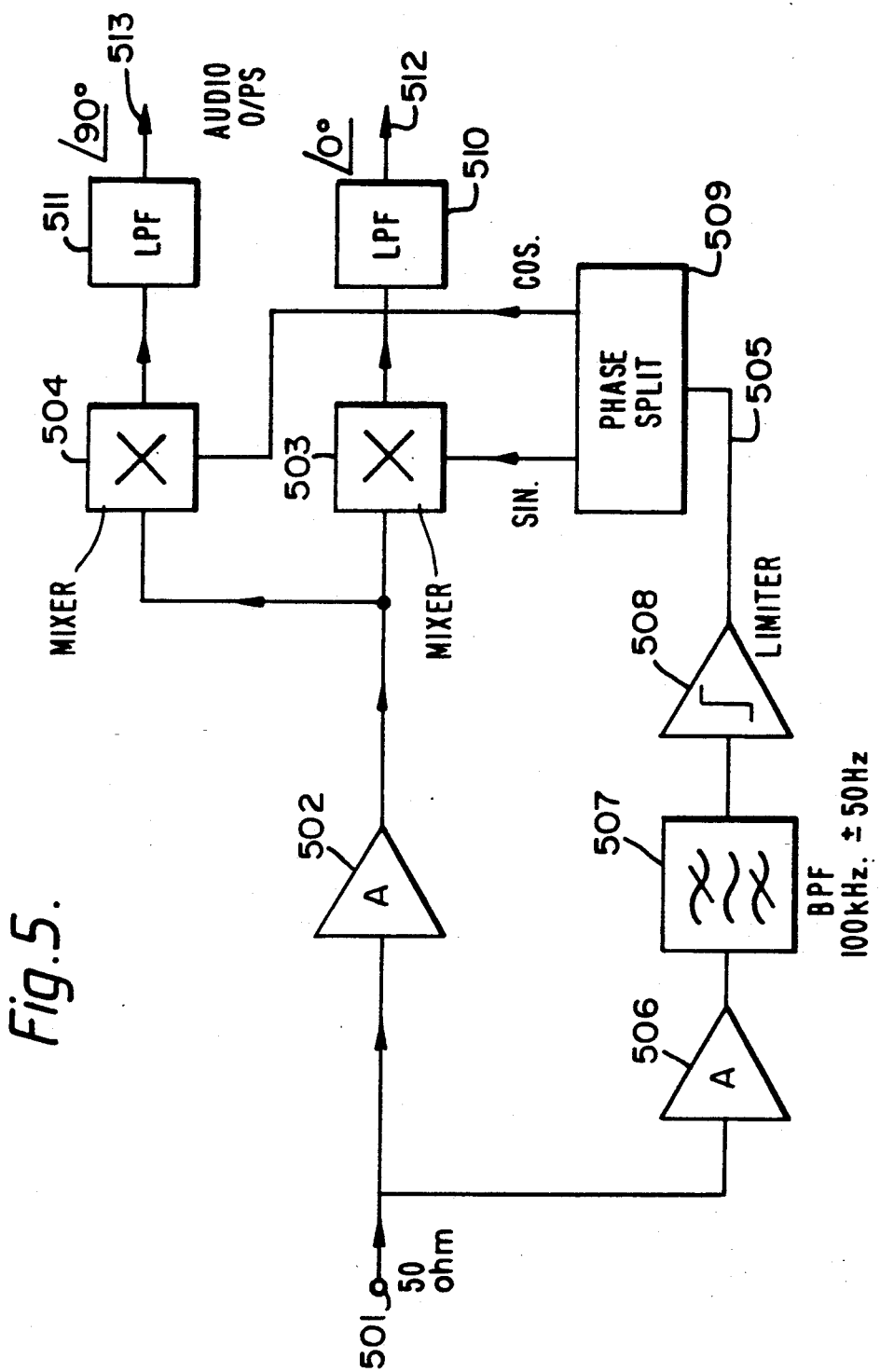
FIG. 5 is a block diagram of a synchronous signal detection circuit.

The demodulation of the signal is done using the synchronous signal detection circuit shown in FIG. 5. The 100 kHz IF signal from the output of the receiver 401 is connected to the input 501 of the detection circuit. The input 501 is connected via an amplifier 502 to two product detectors 503 and 504 where the 100 kHz IF signal is mixed in phase and in phase quadrature with a 100 kHz signal 505 derived from the If carrier signal. The insertion signal 505 is obtained by connecting the 100 kHz If signal via a second amplifier 506 to a band pass (BP) filter 507 which filters out the dsb AM received sounding signal as well as most of the interference. The BP filter 507 has a centre frequency of 100 kHz and a band-width of ±50 Hz. The filtered carrier signal is limited (508) and after further filtering (not shown) is connected to a phase splitter 509. The signals at the phase splitter outputs, in phase quadrature, are connected to the respective mixers 503 and 504.

The product terms in the outputs from the mixers 503 and 504 are then low pass filtered (510, 511) to give two phase-quadratured audio outputs 512 and 513.

The sounding signal uses conventional double-sideband amplitude modulation. These signals are usually demodulated in a radio receiver using envelope or diode type detectors. Unfortunately although these methods are very simple they only work properly when the signal-to-noise ratio (S/N) is good. To obtain proper demodulation in lower S/N it is important to use synchronous detection. If the frequency stability of the system and the sky-wave radio path was good enough then synchronous detection could be easily done by re-inserting the known carrier frequency in a product detector. True synchronous detection cannot be used in this application however because the end to end frequency stability of the complete system cannot be guaranteed to be less than 4 Hz at all times. This degree of stability is necessary to ensure the accurate operation of the cross-correlators. The synchronous signal detection circuit shown in FIG. 5 has a fast response time, normally taking less than 20 ms to correct the phase and frequency of the mixer signals. It can also cope with fading signals provided these are not too deep or the S/N is not too poor.

Figure 6:
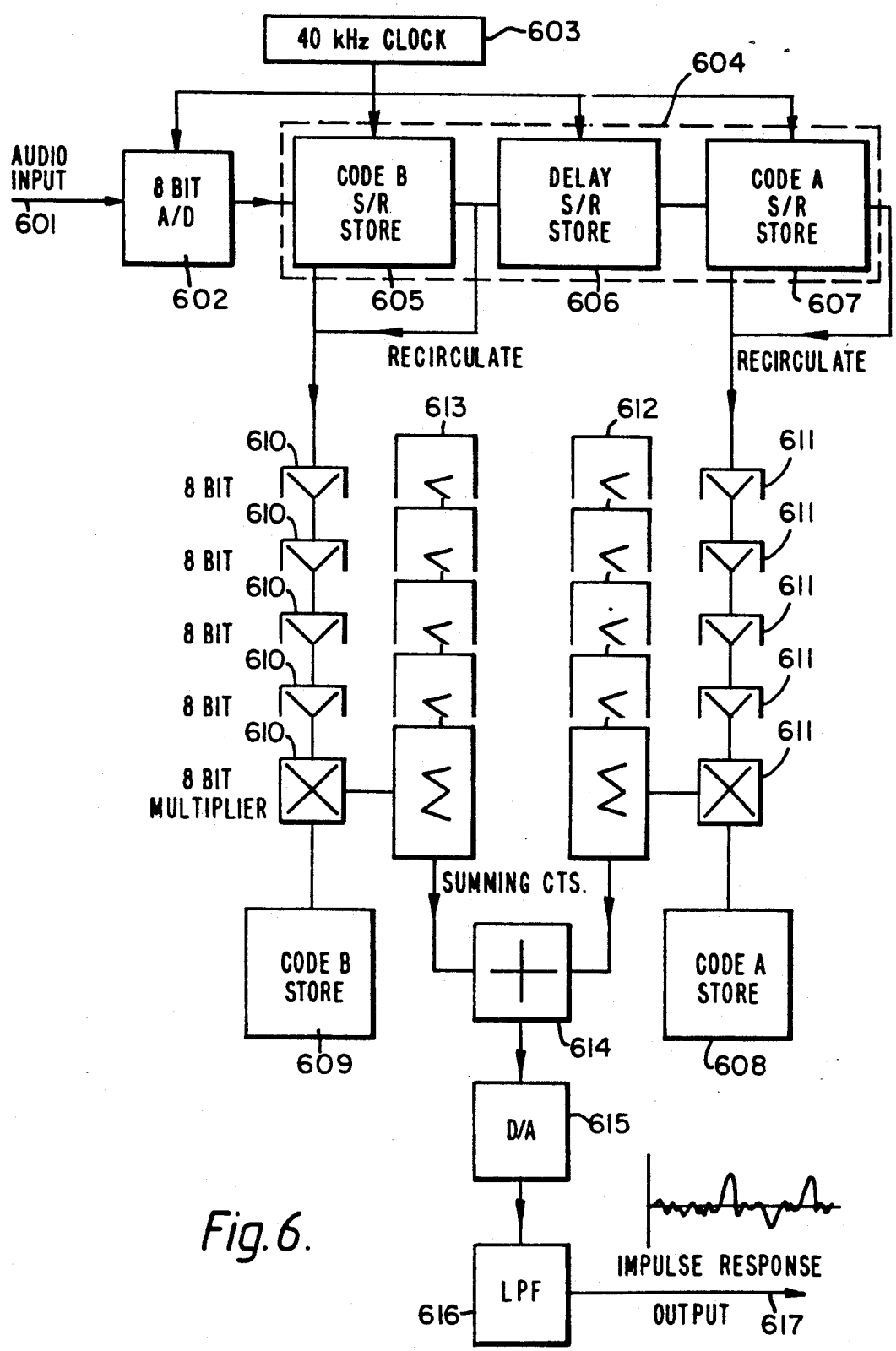
FIG. 6 is a block diagram of a cross-correlation circuit.

A cross correlation circuit shown in FIG. 6 is provided to receive the baseband audio signal from each of the outputs 512, 513 of the detection circuit (FIG. 5). The signal at input 601 is sampled by an 8-bit A/D converter 602 controlled by a signal from a 40 kHz clock 603. The digitised signal is clocked into a special shift register 604 comprising three series-connected shift register stores 605–607. The central shift register 606 acts as a time delay of about 12.8 ms equal to the time separation of the two parts A and B of the complementary coded transmitted signal (FIG. 3). The stores 605 and 607 are of such capacity that when code A is completely stored in the register 607, code B is stored in the first register 605. The stores 605 and 607 are recirculating stores such that the separate parts A and B can be entirely recirculated, in synchronism, in the respective stores 607 and 605 between successive 40 kHz Clock pulses. Parts A and B of the correlation process are stored in the receiver memory stores 608 and 609. The output from the shift register code B store 605 and the code B memory store 609 are connected to inputs of a first 8-bit multiplier 610 and similarly the stores 607 and 608 for the transmitted code A and the stored code A are connected to a second multiplier 611. The contents of both A and B shift registers are multiplied by the appropriate code sequence after every shift register clock pulse. These two product streams are then summed in respective summers 612, 613 over the code length and then added together in adder 614 before digital to analogue conversion in a D/A converter 615 and low pass filtering in a LPF 616. By this means the two halves of the code are cross-correlated separately and then added to produce the desired output. The correlation peak is obtained when the first bit of the first half of the code is in the last stage of the code A shift register 607. The first bit of the second half of the code will then be in the last stage of the code B shift register 605.

Although the delay between the two parts of the code has been set at 12.8 ms it could be varied. It is important however that it should exceed the maximum path dispersion. This has been found to be typically 10 ms or less. If the delay were less than this maximum path dispersion then the output signal 617 from the cross-correlator would be corrupted by echo signals of code A arriving at the receiver at the same time as Code B. This would produce "ghost" peaks in the output impulse response.

Figure 7:
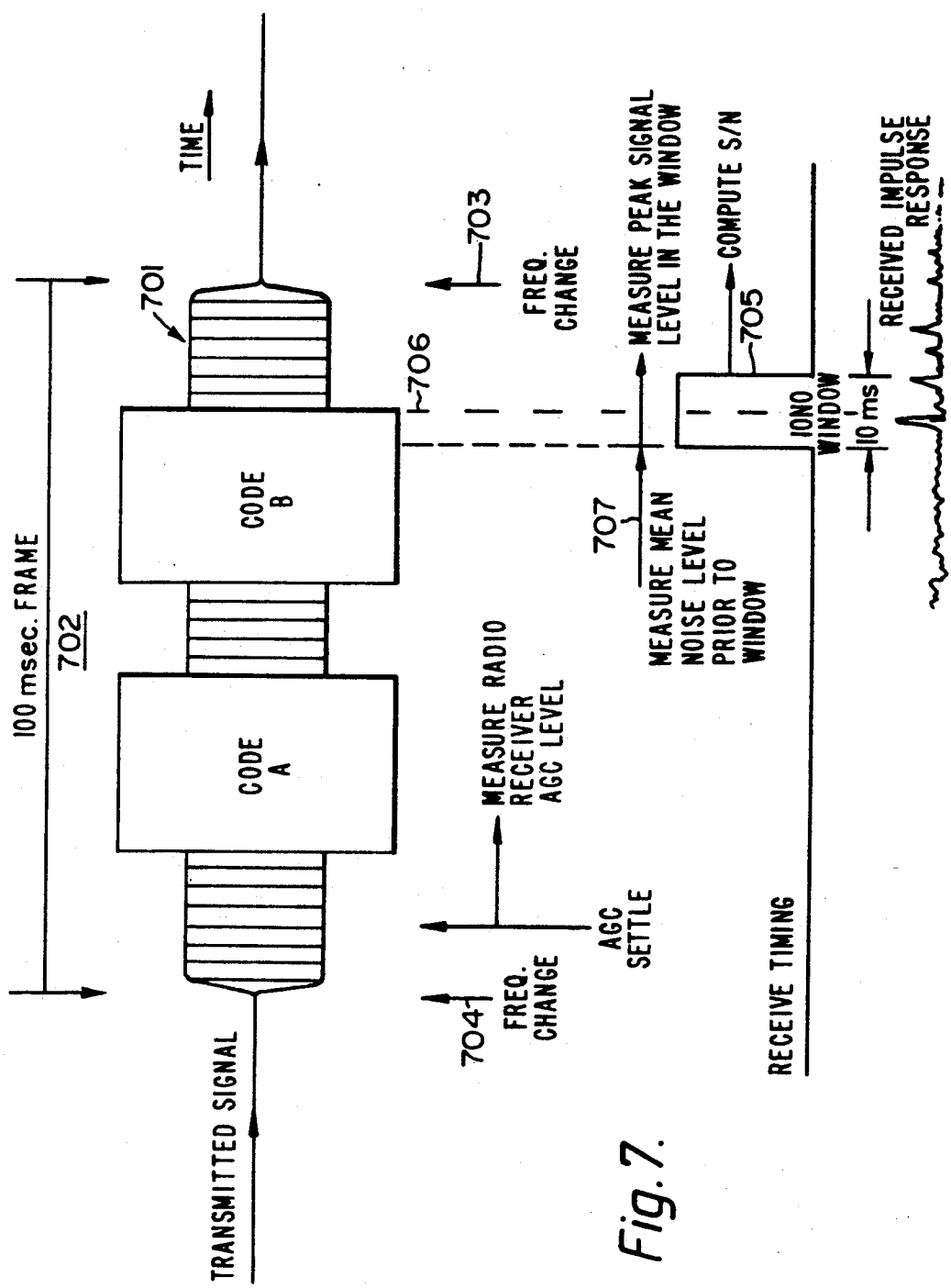
FIG. 7 is a schematic representation of the receiver tuning sequence.

FIG. 7 illustrates the timing requirements of the receiver. The transmitted signal pulse 701 occupies a 100 ms time frame 702 and the receiver frequency changes 703, 704 take place every 100 ms in synchronism with the frequency changes in the received pulses. The correlator output signal is sampled for the presence of a transmitted signal during a 10 ms window 705 centred on the time 706 when the last stage of the code B register should be filled by the first bit of the second part of the coded transmission. The window 705 is selected to be less than the guard interval between the two halves A and B of the code. The peak signal is measured in this window 705 as described below. Immediately prior to the signal window 705 the mean noise level is measured over the time interval indicated by the line 707. From the ratio of these two quantities the signal-to-noise can be computed for that particular frequency. The gain of the receiver is continually monitored by measuring the radio receiver automatic gain control (AGC) level in each 100 ms pulse frame. The measurement is made a short time after the frequency change 704 to allow settling of the receiver AGC.

Figure 8:
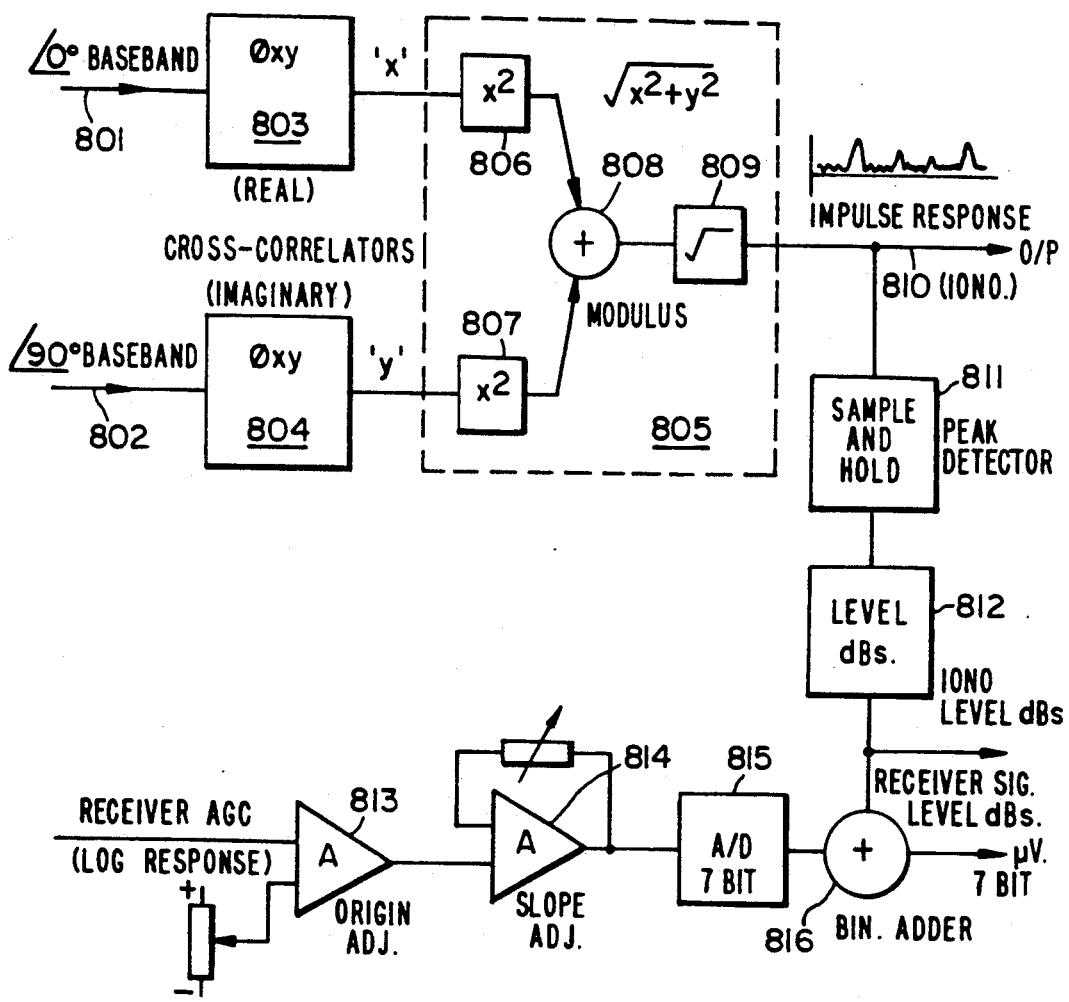
FIG. 8 is a block diagram of a received signal level detector.

The processing of the signal output from the cross-correlators 405, 406 is shown in more detail in FIG. 8. The baseband in-phase signal at the output 512 and the quadrature signal at the output 513 from the synchronous signal detector (FIG. 5) are connected to the imputs 801, 802 of the real and imaginary cross-correlators 803, 804. The output signals from the correlators representing the complex impulse response are connected to a unit 805 which derives the modulus of the output signals. The output signals are connected to respective squaring circuits 806, 807 and the outputs from these circuits are combined in an adder 808 and the square root taken from the sum in the circuit 809. The impulse response signal at the output 810 is sampled during the window period 705 by a peak detector 811 and this peak is then converted into a binary number level signal measured in dBs in a level circuit 812. The AGC level of the receiver 401 (FIG. 4) is modified by adjustment of the origin and slope of its response curve. The receiver AGC signal, measured as shown in FIG. 7, is connected to a first input of a difference amplifier 813, the second input voltage being adjustable so as to adjust the zero level for the amplifier. The output from the origin adjusting amplifier 813 is connected to a first input of a second difference amplifier 814 with adjustable feedback to the second input so as to adjust the slope of the AGC signal. The adjusted AGC signal output from the amplifier 814 is digitised by a 7-bit A/D converter 815. The adjustments are made such that the digital output from the A/D converter 815 is a dB ratio referred to 1 $\mu$V. This digital output is then added in a binary adder 816 to the measured peak impulse response level (also converted to dBs) to produce the desired output.

It is necessary to measure the sounding signal level using this particular method because readings will sometimes be required when the input signal-to-noise to the system is low.

The processing gain of the receiving system will produce an output S/N which is considerably better than the input to it. But the actual output signal level (the peak level of the impulse response) will depend upon the input S/N to the radio receiver. Meanwhile, the receiver AGC level represents the total input signal to the radio which will normally include the sounding signal and/or any noise. This AGC however is used to ensure that the audio output level from the receiver will be constant, irrespective of the input signal-to-noise ratio. It therefore follows that the signal (sounding) level to and out of the cross-correlators will fall as the input signal-to-noise ratio to the radio receiver falls.

For input S/N ratios greater than 10 dB, the signal to the correlators will be constant because the AGC is 'captured' by the sounding signal. Below 10 dB the AGC is affected by signal and noise. At 0 dB the receiver AGC is operating on equal levels of noise and signal so the signal output level will be 3 dB lower. At lower input S/N ratios the signal output level will be proportionally lower.

Figure 9:
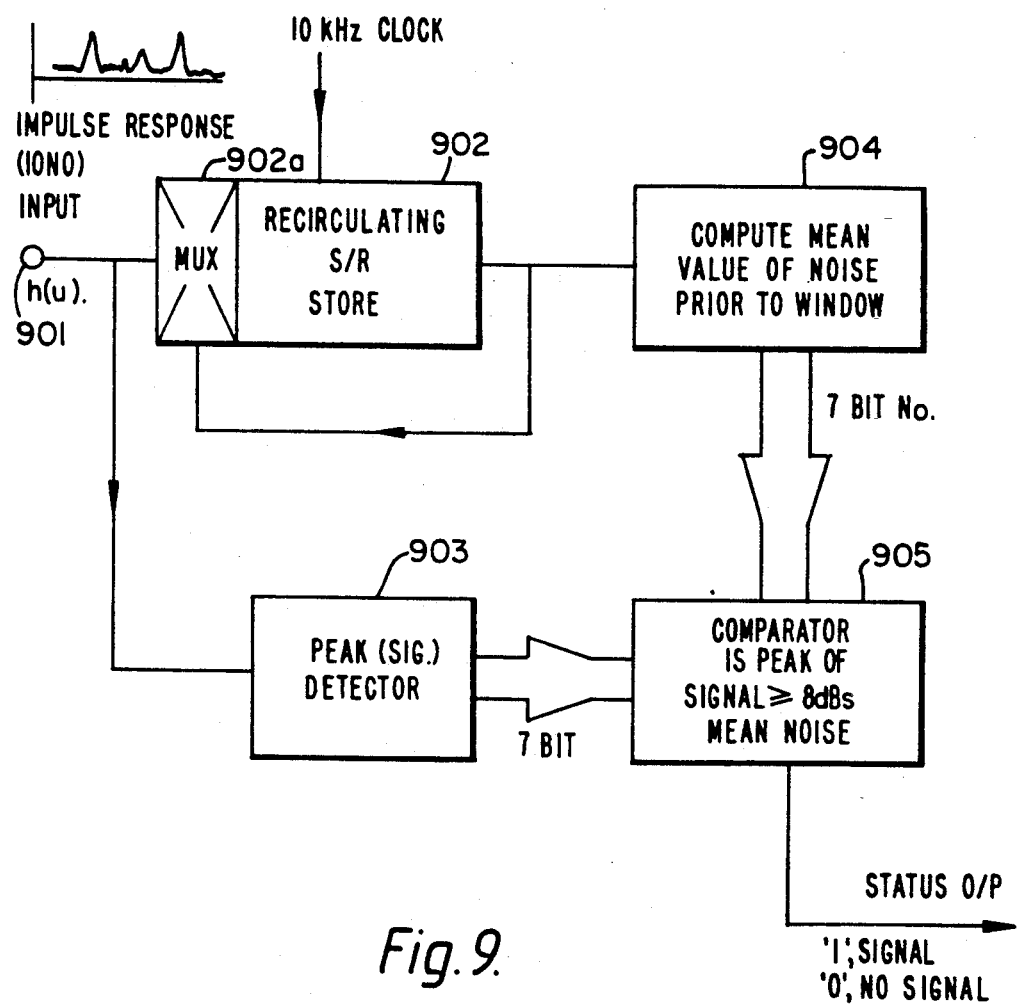
FIG. 9 is a block diagram of a sounding signal recognition circuit.

Correct recognition of the sounding signals can be accomplished using the circuit shown in FIG. 9. The modulus of the impulse response signal at the output 810 from the received signal level detector (FIG. 8) is connected to the input 901 to a multiplexer 902a at the imput of a recirculating shift register store 902 clocked at 10 kHz. The impulse response at the input 901 is also connected to a peak detector 903 which measures the peak signal in the time window 705 as did the peak detector 811 in the FIG. 8 arrangement. The output from the recirculating store 902 is connected to a calculation unit 904 which computes the mean value of noise in the period 707 (FIG. 7) prior to the peak measurement window 75. The outputs from the noise calculation unit and the peak signal detector 903 are 7 bit binary numbers which are compared in a comparator 905 arranged to produce an output binary "1" if S/N≧8 dB and a "0" otherwise.

Thus for each pulse there will be produced a status "1" or a status "0" depending upon whether that frequency is providing a usable sounding channel. At a transmission rate of 10 pseudo-random frequency hops per second there will be produced a 10 bps stream of status bits together with signal level and impulse response characteristics relayed back to a communications receiver/transmitter co-located with the sounder transmitter to enable the communications transmitter to optimise the frequencies selected for communicating over the sounding path. Scattering functions for each channel can be derived from the received sounding pulses and characteristics for perhaps several hundred frequencies can be accumulated in a minute or so. These characteristics can then be updated at the scanning rate. The received signal strength (dB $\mu$V) and mode structure for every tested frequency can be stored to await subsequent interrogation and processing to perhaps decide which frequency or frequencies have the highest probability of propagating a transmitted signal with minimum distortion and with the highest received signal-to-noise ratio.

Trials have shown that it would be necessary on occasions to change frequency up to 200 times in a day in order to maintain a communications circuit having the highest possible received signal strength. In practice this may not be required however because a good signal to noise ratio is far more important than having the strongest signal. This may considerably reduce the number of frequency changes required.

The early experimental work has been sufficiently encouraging to conceive of the adoption of facilities to enable a more exhaustive evaluation of an operational HF communications management system. It is possible to use a more sophisticated coding structure for the sounding pulses so as to allow for the simultaneous transmission of data over the broadcast sounding net. These sounding pulses will therefore not only provide the mobile operator with the characteristics of the radio path but also provide information about interference levels and channel availability at the base station. In the simplest example, two semi-orthogonal binary codes may be used to represent replectively a data "1" or a data "0". In an extention of this basic idea the inventor has discovered a 512 set of semi-orthogonal 100-bit binary codes. Thus by replacing the single 512-bit complementary code by a code-selected 100-bit binary sequence, additional data or coded information can be transmitted as an aid to improving the overall frequency management of a communications system. This extra information is of particular benefit if the sounder is to be incorporated into an HF Management System. The coded information or data could be used to convey:

a) Interference levels for the given frequency at the sounder transmitter location (or colocation);
b) Selective call—each receiver of the sounding broadcast would be identified by a unique code/number;
c) Frequency availability broadcast—frequencies already in use would be identified;
d) Radiated power control—instructions could be sent over the sounding broadcast to increase or reduce power;
e) Message error control—requests for retransmissions of messages could be made; and
f) Link engineering instructions—other instructions such as crypto input, data speed, message urgency, service being used (e.g. RATT or facsimile) etc.

An HF channel management system linked to a sounding broadcast station would provide a very powerful ability for automatic control of communications systems from numerous remote stations (mobile air, land and sea) to work into a single control station with high reliability, availability and performance.

Given an ability to select an operational frequency having specific propagating characteristics the communicator may choose to select a channel having one or more of the following parameters:
(1) minimum radio path loss
(2) minimum interference level
(3) single mode path structure
(4) highest usable frequency (when any other receiver closer than the transmitter receiver separation will be unable to receive the transmitter signal via a sky-wave) or
(5) maximum received S/N ratio.

In practice it is found that most naturally occurring propagation paths tend to be perturbed by significant amounts of interference, mainly from other users. This is because a path that can propagate a signal for one particular user is similarly likely to do so for other users, particularly if the transmitters and receivers are more or less geographically co-located. Fortunately however most HF signals are narrow band and so interference from these other users can nearly always be avoided by simply changing the operating frequency by a few kHz to a relatively more quiet channel in which to operate. Thus, the invention provides the means for real time frequency sounding which can be arranged to automatically tune to the optimum frequency or frequencies.

I claim:

1. An ionospheric sounding system for providing frequency management information for high frequency (HF) communications comprising a HF radio transmitter having frequency selection means for causing pulses of energy to be transmitted at respective frequencies selected from the HF range of radio frequencies and a remote HF radio receiver having programmable frequency selection means for sensitizing the receiver to the transmitted sequence of frequencies wherein the improvement lies in including in the transmitter a modulation means for modulating each transmitted pulse with a code having an impulsive autocorrelation function and the receiver is arranged such that the received signal is detected by a synchronous correlation detector comprising an in-phase correlator and a phase-quadrature correlator (sin and cos correlators), the input to the receiver being connected to respective first inputs of the sin and cos correlators where the phase-quadratured signals are correlated against a stored replica of the transmitted code, there being provided also a means for measuring the gain of the receiver prior to connection to the synchronous correlation detector said synchronous correlation detector comprising a means for measuring the amplitude, phase and time properties of the received signal at the receiver input for each transmitted frequency to enable an optimum selection of transmission frequencies to be made.

2. An ionospheric sounding system according to claim 1 wherein the code is a complementary code having two parts whose separate autocorrelation functions add to produce an impulsive function.

3. An ionospheric sounding system according to claim 2 wherein the code is selectable from a plurality of codes and the receiver is capable of receiving and distinguishing the codes whereby information can be transmitted by means of the code selection.

4. An ionospheric sounding system according to claim 3 wherein the transmitter is provided with a time code modem for producing a time of day signal and a modulation modulation control and a switch means connected therebetween for selectively connecting one of the sounding code and the time code to the modulation means, and the receiver is provided with a similar time code modem to provide time of day information and facilitate synchronizing of the receiver with the received signal.

5. An ionospheric sounding system according to claim 4 wherein the phase quadrature circuit comprises sin and cos product detectors to which the received signal is connected, and a local frequency signal is connected to the product detectors, the local frequency being derived from the transmitted carrier signal after filtering out modulation from the received signal, the outputs from the product detectors then being connected to the respective real and imaginary cross-correlators.

6. An ionospheric sounding system according to claim 5 wherein the means to measure the gain of the receiver includes an automatic gain control (AGC) and there is provided means to measure the AGC level during each received pulse.

7. An ionospheric sounding system according to claim 6 wherein there is provided means to modify the measured receiver AGC level such that the measured peak impulse response level can be calibrated.

8. An ionospheric sounding system according to claim 7 wherein there is included means to measure the mean noise level in the receiver prior to a measurement interval when the peak impulse response is measured.

9. An ionospheric sounding system according to claim 8 wherein a comparator is included such that an output signal is generated whenever the measured peak exceeds the mean noise level by a predetermined amount.

10. An ionospheric sounding system according to claim 9 wherein the receiver is provided with means to record the received signal strength measured in dB, the measured noise level and the mode structure (impulse response) for each transmitted frequency.

11. An ionospheric sounding system according to claim 10 wherein the transmitted frequencies are pseudo-randomly selected and are distributed throughout the HF band.

12. An ionospheric sounding system according to claim 11 wherein each frequency pulse is narrow band, being less than about 1 k Hz.

13. An ionospheric sounding system according to claim 9 wherein the transmitted frequencies are pseudo-randomly selected and are distributed throughout the HF band.

14. An ionospheric sounding system according to claim 13 wherein each frequency pulse is narrow band, being less than about 1 k Hz.

15. An ionospheric sounding system according to claim 3 wherein the phase quadrature circuit comprises sin and cos product detectors to which the received signal is connected, and a local frequency signal is connected to the product detectors, the local frequency being derived from the transmitted carrier signal after filtering out modulation from the received signal, the outputs from the product detectors then being connected to the respective real and imaginary cross-correlators.

16. An ionospheric sounding system according to claim 15 wherein the receiver has an automatic gain control (AGC) and there is provided means to measure the AGC level during each received pulse.

17. An ionospheric sounding system according to claim 16 wherein there is provided means to modify the measured receiver AGC level such that the measured peak impulse response level can be calibrated.

18. An ionospheric sounding system according to claim 17 wherein there is included means to measure the mean noise level in the receiver prior to a measurement interval when the peak impulse response is measured.

19. An ionospheric sounding system according to claim 18 wherein a comparator is included such that an output signal is generated whenever the measured peak exceeds the mean noise level by a predetermined amount.

20. An ionospheric sounding system according to claim 19 wherein the receiver is provided with means to record the received signal strength measured in dB, the measured noise level and the mode structure (impulse response) for each transmitted frequency.

21. An ionospheric sounding system according to claim 20 wherein the transmitted frequencies are pseudo-randomly selected and are distributed throughout the HF band.

22. An ionospheric sounding system according to claim 21 wherein each frequency pulse is narrow band, being less than about 1 k Hz.

23. An ionospheric sounding system according to claim 19 wherein the transmitted frequencies are pseudo-randomly selected and are distributed throughout the HF band.

24. An ionospheric sounding system according to claim 23 wherein each frequency pulse is narrow band, being less than about 1 k Hz.

25. An ionospheric sounding system according to claim 1 wherein the code is selectable from a plurality of codes and the receiver is capable of receiving and distinguishing the codes whereby information can be transmitted by means of the code selection.

26. An ionospheric sounding system according to claim 25 wherein the phase quadrature circuit comprises sin and cos product detectors to which the received signal is connected, and a local frequency signal is connected to the product detectors, the local frequency being derived from the transitted carrier signal after filtering out modulation from the received signal, the outputs from the product detectors then being connected to the respective real and imaginary cross-correlators.

27. An ionospheric sounding system according to claim 26 wherein the receiver has an automatic gain control (AGC) and there is provided means to measure the AGC level during each received pulse.

28. An ionospheric sounding system according to claim 27 wherein there is provided means to modify the measured receiver AGC level such that the measured peak impulse response level can be calibrated.

29. An ionospheric sounding system according to claim 28 wherein there is included means to measure the mean noise level in the receiver prior to a measurement interval or window when the peak impulse response is measured.

30. An ionospheric sounding system according to claim 29 wherein a comparator is included such that an output signal is generated whenever the measured peak exceeds the mean noise level by a predetermined amount.

31. An ionospheric sounding system according to claim 30 wherein the transmitted frequencies are pseudo-randomly selected and are distributed throughout the HF band.

32. An ionospheric sounding system according to claim 31 wherein each frequency pulse is narrow band, being less than about 1 k Hz.

33. An ionospheric sounding system according to claim 30 wherein the receiver is provided with means to record the received signal strength measured in dB, the measured noise level and the mode structure (impulse response) for each transmitted frequency.

34. An ionospheric sounding system according to claim 33 wherein the transmitted frequencies are pseudo-randomly selected and are distributed throughout the HF band.

35. An ionospheric sounding system according to claim 34 wherein each frequency pulse is narrow band, being less than about 1 k Hz.

* * * * *